United States Patent
Anastassopoulos et al.

(10) Patent No.: US 7,526,410 B2
(45) Date of Patent: Apr. 28, 2009

(54) REMOTE COMPUTER GRAPHICS PERFORMANCE TESTING

(75) Inventors: Demitri Anastassopoulos, Redmond, WA (US); Jason Charles Browne, Kirkland, WA (US); Donald Alan Page, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 145 days.

(21) Appl. No.: 10/613,179

(22) Filed: Jul. 3, 2003

(65) Prior Publication Data

US 2005/0021687 A1 Jan. 27, 2005

(51) Int. Cl.
*G06F 11/30* (2006.01)

(52) U.S. Cl. .................. 702/186; 702/184; 714/27

(58) Field of Classification Search .............. None
See application file for complete search history.

(56) References Cited

U.S. PATENT DOCUMENTS

| | | | | |
|---|---|---|---|---|
| 5,896,494 A | * | 4/1999 | Perugini et al. | 714/27 |
| 5,978,575 A | * | 11/1999 | Packer | 703/21 |
| 6,526,371 B1 | * | 2/2003 | Klein et al. | 702/186 |
| 2001/0012986 A1 | * | 8/2001 | Conan et al. | 702/188 |
| 2003/0098879 A1 | * | 5/2003 | Mathews | 345/762 |
| 2004/0153772 A1 | * | 8/2004 | Gorshenev et al. | 714/25 |
| 2006/0206870 A1 | * | 9/2006 | Moulden et al. | 717/124 |

OTHER PUBLICATIONS

Pfaffenberger, Bryan. Webster's New World Computer Dictionary, Hungry Minds, Inc. Ninth Edition, 2001. p. 340.*

* cited by examiner

*Primary Examiner*—Manuel L Barbee
(74) *Attorney, Agent, or Firm*—Lee & Hayes, PLLC

(57) ABSTRACT

The present disclosure relates to conducting testing on a remote client computer by a server computer. The remote client computer is connected to the server computer through a network which allows either the remote client computer or server computer to initiate a testing session with the other. Programs resident on the remote client computer and server computer initiate the session. A graphics test tool application program is resident on the server computer. The graphics test tool application program includes a set of instructions and data used to communication to a set of instructions and data in the remote client computer. Communication in particular is performed through a communication channel which further allows graphics tests to be sent from the graphics test tool application program to the remote client computer. The graphics tests may be timed as to how long they take to be sent to the remote client computer.

48 Claims, 4 Drawing Sheets

REMOTE COMPUTER GRAPHICS PERFORMANCE TESTING

TECHNICAL FIELD

This disclosure relates to testing computers from a server computer, and specifically to graphics testing of remote client computers through a communication channel and use of a test tool application resident in the server computer.

BACKGROUND

Computers, in particular personal computers (PC), are configured with various hardware and software components. PC manufacturers are numerous, and the different PC configurations offered are even greater.

In some cases, a particular version of a hardware component may be used for different PC components. The behavior or performance of the particular hardware component may vary between various PC configurations, since particular PC configurations affect the hardware component differently. The hardware component may rely on a software driver (driver) that instructs the hardware component how to operate. Optimization of the hardware component within a particular PC configuration may be performed by providing a driver which factors how the hardware component operates within the particular PC configuration. Alternatively, hardware changes may be made to the hardware component.

An example of a hardware component is a graphics card that interacts with a PC display, PC operating system, and graphics software, where the graphics software may interact with a video adapter and a hard drive. When testing is performed on a graphics card, not only is the graphics card tested, but the various hardware and software components it interacts with are also tested.

To properly create drivers or provide hardware changes that optimize performance of the hardware component, testing is performed on the hardware component in the particular PC configuration. Typically, various editions of a driver and/or the hardware component are installed and tested for each particular PC configuration, and tests are run to determine optimal changes between driver editions and hardware component versions. In certain situations it is desirable to compare different hardware components with one another for a particular PC configuration or configurations. For example, a graphics card vendor may want to compare its graphics card with that of a competitor. In other cases, a PC manufacturer may desire to compare various graphics cards.

"Thin client" PCs lend themselves to testing using varying hardware configurations, since thin client PCs have limited software components. In particular, thin client PCs rely on a server computer to provide software applications. Therefore, the software configuration of a thin client PC remains consistent, while its hardware configuration may vary.

Various metrics may be used in testing. A particular metric is time. Tests are timed and compared to one another to determine improvements in how long a test is ran for different hardware components and/or drivers for a particular PC configuration.

A test application program that tests the hardware component may be installed on a particular PC configuration and run using a particular edition of the driver and/or version of the hardware component. This is referred to as "standalone" testing and a copy of the test application program is installed for each PC configuration. For multiple PC configurations, multiple copies of the test application program may be needed. In certain cases, a dedicated computer that includes the test application may perform testing for multiple computers. There may be a need to provide test specific interconnections to physically connect the dedicated computers to the multiple computers to create a test specific environment.

Test results from the testing are gathered and/or sent to a party that creates the driver. Changes to the driver and/or hardware component may be made that optimize performance for the particular hardware configuration. The new driver and/or hardware component is then sent to the PC manufacturer or integrator. The new driver and/or hardware component is installed. New tests are performed with the new driver and/or hardware component. The new test results may be sent back to the party creating the drivers. A new driver and/or hardware component may or may not be sent to the PC manufacturer or integrator.

Creating an optimal driver or hardware component for each PC configuration may take numerous iterations of testing, gathering tests, sending tests, and retesting. When testing is involved and consumes considerable time, such as the case for graphics testing, there may not be the luxury to perform numerous iterations of testing.

Oftentimes, PC manufacturers and hardware components rely on a compromised "generic" driver that is used for all PC configurations. However, this may be unacceptable for particular PC configurations in that the associated hardware component may be inoperative or its operation considerably degraded for particular PC configurations. Substituting a customized driver or set of drivers for the generic driver may allow the same hardware component to properly function in the particular PC configuration. However, creating such drivers requires iterations of testing and retesting.

It is therefore desirable to provide a method and system of testing such as graphics testing from a central resource such as a server computer on various remote client computers (e.g., thin client PCs) without the need to install test tool applications on the remote client computers, and determine test results at either the client PC or the central resource.

SUMMARY

This disclosure describes computer graphics performance testing that includes establishing a session between a server computer having a test tool application and remote client computers. Unique instructions and data are sent to the remote client computer, a communication channel is created to allow testing information to be sent to the remote client computer, where the set of instructions and data is used to communicate through the communication channel.

In certain embodiments, individual tests are provided and testing information regarding each of the individual tests are sent over the communication channel and timed as to how long it takes for the testing information to be received by the remote client computer.

DETAILED DESCRIPTION

Figure 1:
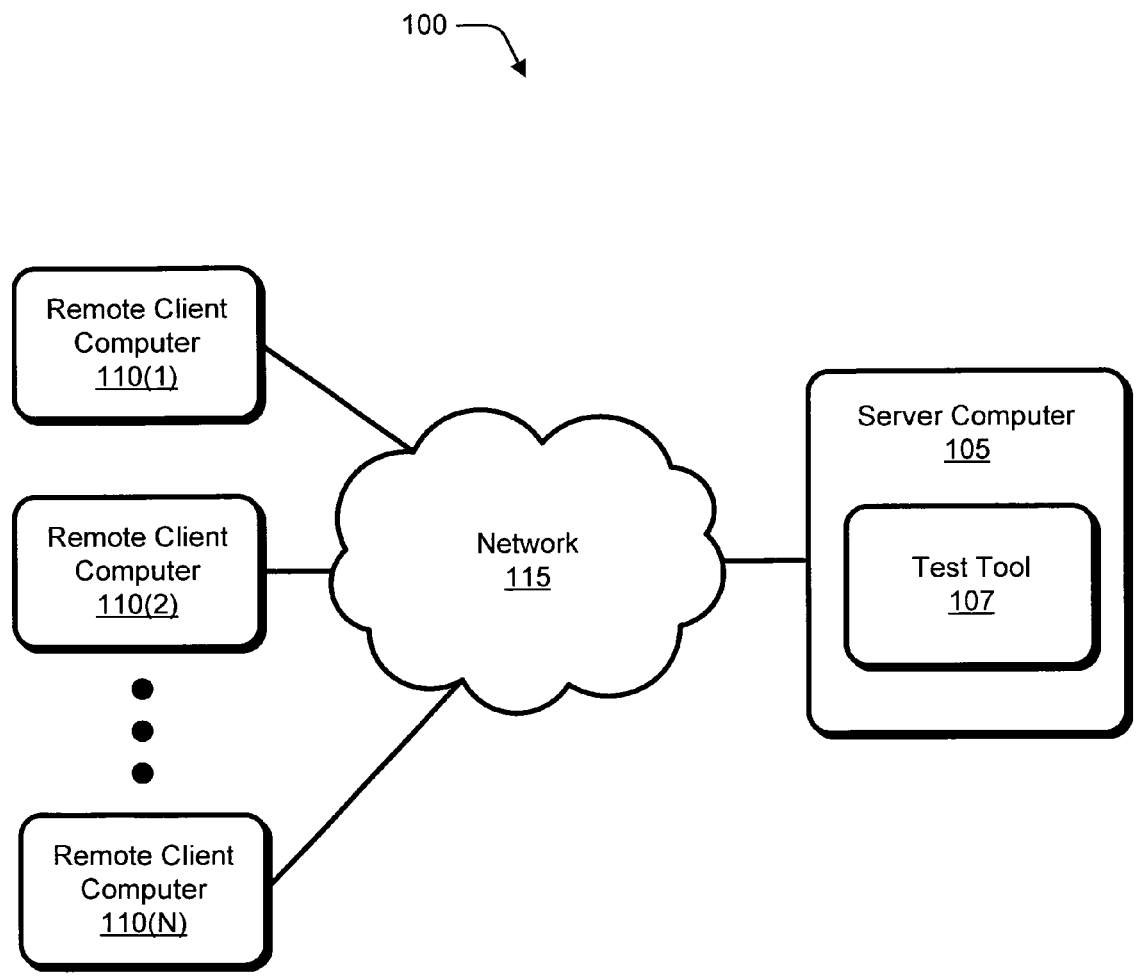
FIG. 1 is a block diagram illustrating a system of remote client computers connected to a server computer by a network.

FIG. 1 illustrates a system 100 of computers connected by a network. In particular, a server computer 105 is connected to one or more remote client computers 110(1), 110(2) . . . 110(N) through a network 115.

Server computer 105 and remote client computers 110(1), 110(2) . . . 110(N) are implemented with Microsoft® Windows® operating systems and may be configured with various hardware and software components. In particular, server computer 105 is configured with a test application program or programs that may be referred to as a test tool 107. Test tool 107 may be a graphics test application program that includes a list or series of individual tests. An example of test tool 107 is WinBench® by the Veritest® Company. The WinBench® test tool application comprises multiple individual tests that are run sequentially according to a list to test the graphics capabilities of a computer. Some of the tests performed include DirectDraw® tests which are directed to video processing from a PC central processing unit (CPU) to a video adaptor; disk inspection tests directed to hard disk utilization and CPU transfer rate; graphics display interface (GDI) testing directed to how graphics are displayed by the Microsoft® Windows® operating system; and WinMark® tests as defined by the Ziff-Davis Company directed to graphics accelerators, disk speed, and disk caching.

Testing information, such as individual graphics tests, from the test tool 107 may be transferred to remote client computers 110(1), 110(2) . . . 110(N). Remote client computers 110 may include thin client PCs that have minimal software application programs and rely on a server computer for application programs. Server computer 105 may operate as a server computer providing application programs, or another server computer (not shown) may provide such application programs.

Network 115 may be an "open" network that may include other computers and devices. It is contemplated that network 115 is not limited to providing a testing connection between server computer 105 and remote client computers 110(1), 110(2) . . . 110(N). In other words, network 115 may provide communications between the computers other than communications directed to testing. As such, remote client computers 110(1), 110(2) . . . 110(N) may initiate or establish a session with server computer 105. Alternatively, server computer 105 may establish a session with any one of remote client computers 110(1), 110(2) . . . 110(N). Establishing such a session may be performed by sending a request from server computer 105 to one of remote clients 110(1), 110(2) . . . 110(N) through network 105, or one of remote client computers 110(1), 110(2) . . . 110(N) sending a request to server computer 105.

Further, network 115 may be comprised of wide area networks (WAN) and various sub-networks, and include the Internet. Connections within network 115 may include wired and wireless connections which allow server computer 105 and remote client computers 110(1), 110(2) . . . 110(N) to couple to network 115. In certain instances particular computers may have a preferred connection to network 105. For example, remote client computer 110(1) may be connected by a serial IEEE 1394 "firewire" connection; remote client computer 110(2) may be connected through a universal serial bus (USB) connection; and remote client computer 110(N) may be connected through a wireless 802.11 connection.

Figure 2:
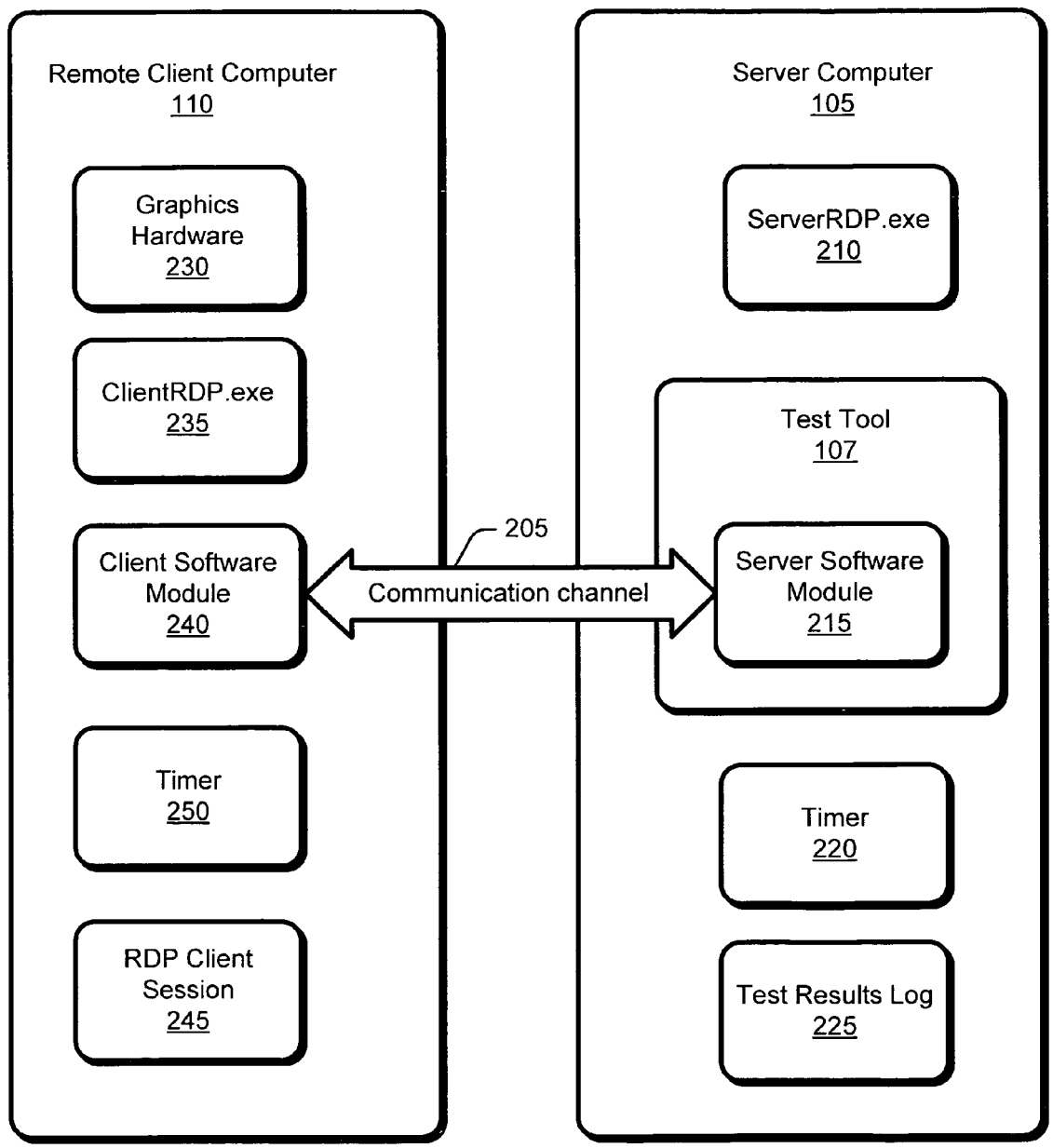
FIG. 2 is a block diagram illustrating the server computer, one remote client computer, and a communication channel to carry testing information between the server and remote client computers.

FIG. 2 shows the server computer 105 and one of the remote client computers 110 in more detail. After a session is established between the remote client computer 110 and the server computer 105, the computers create a communication channel 205 between them. Communication channel 205 is established over network 105 of FIG. 1 to facilitate exchange of testing information, such as graphics testing, between the server computer 105 and the remote client computer 110.

Communication channel 205 may be implemented as a virtual channel which connects virtual channel connections (not shown) on server computer 105 and remote client computer 110. Specifically, a virtual channel allows asynchronous transfer mode (ATM) cells to be transported between server computer 105 and remote client computer 110, where the ATM cells may represent testing information. In general a communication channel such as a virtual channel provides the ability to transfer information between two devices such as server computer 105 and remote client computer 110. In this example and as described further detail below, graphics testing information is sent from server computer 105 and received by remote client computer 110. In particular, tests (i.e., test information from tests) from test tool 107 are sent across communication channel 205, and the tests are timed as they received/performed at either server computer 105 or remote client computer 110. For tests in a sequential list of tests, each test is timed as to how long the test is sent across communication channel 205. A test in a sequentially ordered list of tests is not sent out unless the previous test has been completely sent across communication channel 205. Therefore the time that a test takes to go across communication channel 205 is indicative of how well the test performed.

Server computer 105 includes an executable file software program called "serverRDP.exe" 210 which is a remote desktop protocol (RDP) program used to establish a session with remote client computer 110. The program "serverRDP.exe" may be resident in a startup folder in server computer 105 and initiated by remote client computer 110 when remote client computer 110 initiates a session. The software program "serverRDP.exe" 210 may be a Windows® based RDP used to communicate between and with thin client PCs. For example, server computer 105 is a thin client server computer accessible by remote client computer 110 which is a thin client PC.

Included in test tool application 107 is a server software module 215 that is comprised of a set of instructions and data. The set of instructions and data may be embodied as a dynamic link library (DLL) file. A DLL file is a set of programs which may be called up by a program that operates within a computer such as server computer 105. The DLL file allows other program operating within a computer to communicate with a device or another computer such as remote client computer 110. In this example, software module 215 provides test tool application 107 the ability to transfer testing information to remote client computer 110 over the communication channel 205. Instructions and data of server software module 215 may be in a register key in an operating system of server computer 105.

Server computer 105 further includes a timer 220 that is configured to time test and test information as they are sent across communications channel 205, and a test results log 225 configured to store test results for particular sessions with client computer 110.

Remote client computer 110 includes graphics hardware 230 that may include a graphics card, a display (i.e, a video monitor), video adapter cards, and a hard disk or storage device. In this example, graphics testing is performed on graphics hardware 230.

Remote client computer 110 includes an executable file software program called "clientRDP.exe" 235 which is a RDP program used to establish a session with server computer 105. Software program "clientRDP.exe" 235 may be a Windows® based RDP used to communicate to server computer 105, in particular "clientRDP.exe" is used to request instructions and data from server computer 105 to be placed in a client software module 240 which is resident in remote client computer 110. Client software module 240 in particular receives unique instructions and data for each instance of a session that is established between server computer and remote client computer 110.

The software program "clientRDP.exe" 235 locates the instructions and data in software module 230 which are used to access test tool application 107. The set of instructions and data may include a DLL file. The set of instructions and data (i.e., DLL file) in client software module 240 is sent by server computer 105 and received by remote client computer 110 through network 115 of FIG. 1. This may be in the form of a "DLL injection" which sends the required program (i.e, set of instructions and data) to the remote client computer 110 from the server computer 105. It is contemplated that the set of instructions and data can be sent and received prior to creating or establishing communication channel 205.

When initiated by remote client computer 110, "serverRDP.exe" 210 may set up a register key or keys that are used by an operating system of remote client computer 110 to load client software module 240 in an RDP client session module 245 resident in remote client computer 110. RDP client session module 245 may include a log file to store test times and other test results from a session between server computer 105 and remote client computer 110. RDP client session module 245 and its log file may be accessed for test times and test results.

Client software module 240 may time how long it takes for remote client computer 110 to connect to and log on to server computer 105 to establish a session. Timing may be performed by a resident timer 250. Once a session 1 begins, "serverRDP.exe" 210 is initiated from the startup folder and initiates test tool application 107. Server software module 215 installs instructions and data from the register key in the operating system of server computer 105.

When test tool 107 is initiated, instructions in server software module 220 are sent to client software module 240 indicating the beginning of tests and that test information will be sent through communication channel 205.

Test tool 107 may include a list of individual tests that are ran sequentially one after the other. Each test has "begin" and "end" messages that are recognized by software modules 215 and 240. Remote client computer 110 may start timer 250 to time each individual test as test information is received. For example, in graphics testing, bit maps may be sent out as part of tests in test tool application 107. The bit maps are sent through communication channel 205 and timed from the start of receipt to the end of transmission.

In addition, server computer 105 may also perform timing through timer 220 of the tests by determining how long tests are sent to remote client computer 110. The tests of test tool 107 are run sequentially from the list and are timed by timer 220 and/or timer 250. Test times may be stored in a user accessible test results log 225 or a test log in RDP client session 245.

The beginning and ending of tests are provided to remote client computer 110 through communication (i.e., messages sent and received) between server software module 215 and client software module 240. Specifically, server software module 215 is configured to look for the beginning and ending of tests (i.e., begin and end messages) of test application tool 107.

When test tool application 107 completes all tests, test tool application 107 ends. The end of the testing is seen by server module 215 and provides the information to client software module 240 which informs remote client computer 105 that testing has ended. Client software module 240 may time how long it takes to log off and end the session with server computer 105.

Operation

Figure 3:
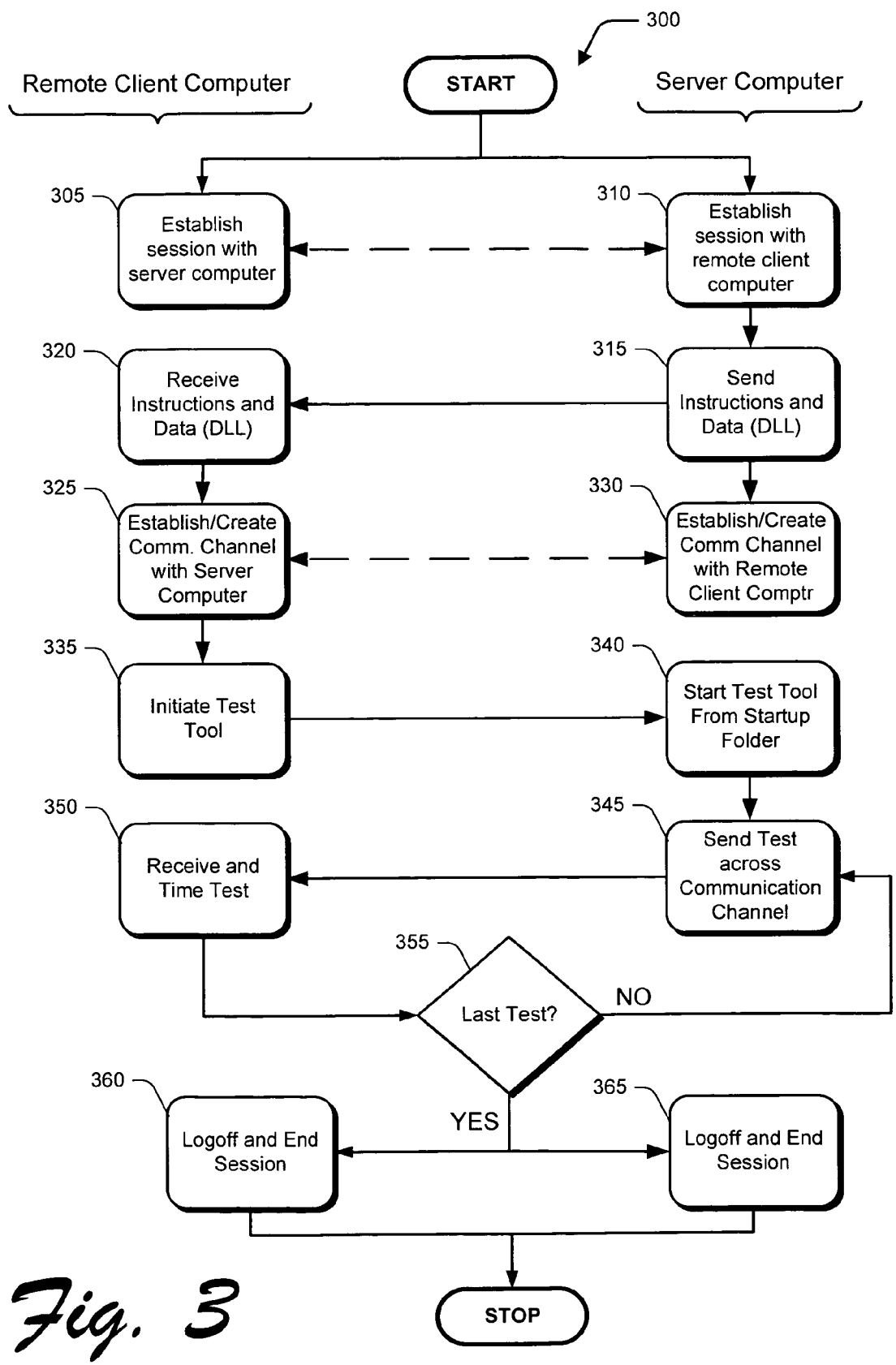
FIG. 3 is a flow chart illustrating a process for remotely testing the remote client computer using testing tools resident at the server computer.

FIG. 3 is a flow chart illustrating a process 300 for remotely testing a remote client computer using a testing tool application resident at a server computer. Process 300 may be implemented with server computer 105 and remote client computer 110 as illustrated in FIG. 2. Process 300 illustrates blocks performed at the remote client computer side and the server computer side.

At block 305, the remote client computer establishes a testing session with the server computer. Establishing a testing may be initiated with a RDP such as "clientRDP.exe" 235 of FIG. 2 that sends a request to establish a testing session with the server computer. The remote client computer may time how long it takes to establish the testing session with the server computer.

Alternatively, at block 310, the server computer may establish a testing session with the remote client computer by sending a request. An RDP such as "serverRDP.exe" 210 may initiate the request for the server computer. The server computer may also time how long it takes to establish the testing session with the remote client computer.

At block 315, a set of instructions and data that may be in the form of a DLL is sent from the server computer. This set of instructions and data is stored at the server computer and may be unique to each particular remote client computer. The set of instructions and data may be placed in server software module 215 which is configured to test tool 107 of FIG. 2. The set of instructions and data allow tests and test information from test tool 107 to be sent to the remote client computer.

At block 320, the set of instructions and data (e.g., DLL) is received by the remote client computer. The set of instructions and data may be stored in client software module 240 of FIG. 2 which allows the remote client compute to receive the tests and test information from test tool 107 of FIG. 2. As an example, the tests and test information in may be related to graphics testing.

At blocks 325 and 330, a communication channel is established or created with the remote client computer and the server computer. The communication channel may be a virtual channel as described above and illustrated as communication channel 205 of FIG. 2. Tests and test information are sent across the communication channel from the test tool and received at the remote client computer by a client software module. A unique channel identifier may be registered with the server computer that identifies the particular communication channel.

At block 335, the remote client computer may initiate the resident test tool of the server computer, through an RDP such as "clientRDP.exe" 235 of FIG. 2 which may be placed in a start up folder as described above. The initialization command may be sent to an RDP in the server computer such as "serverRDP.exe" 210 of FIG. 2.

At block 340, the server computer may start the resident test tool through an RDP such as "serverRDP.exe" 210 of FIG. 2. The test tool may include a list of individual tests that are ran sequentially one after the other in the list. The test tool may relate to graphics testing, and as an example may include a WinBench® test tool application as described above.

At block 345, the server computer begins sending a test, and indicates the start of each test, of a possible list of tests across through the established communication channel. A timer in server computer (e.g., timer 220 of FIG. 2) may be initiated as to when the test and/or test information is sent and time how long the test and/or test information takes to be sent. The times of the tests may be stored in a test log in the server computer.

At block 350, the remote client computer receives a test (i.e., the start of the test) and/or test information through the communication channel. A timer (e.g., timer 250 of FIG. 2) in the remote client computer is started when a start of the test is indicated, and stops when an end of the test is indicated by the server computer. Timing may be performed to determine how long it takes to receive the test and/or test information. The times of the test may be stored in log of a session file such as RDP client session file 245 of FIG. 2.

At block 355, a determination is made if the test is the last test in the list of tests of the test tool. The determination may be made at the remote client computer and the server computer. The remote client computer, and in particular instructions received in block 320 allow the remote client computer to read begin and end messages for each test, and end of testing for the list of tests. The server computer looks to the resident test tool to indicate end of testing. If additional tests are to be performed (following the "NO" branch of block 355), block 345 is performed.

If there no additional tests to be performed (following the "YES" branch of block 355), blocks 360 and 365 may be performed concurrently or exclusively. At Block 360, a logoff takes place that ends the testing session for the remote client computer. Timing may be performed at the client computer as to how long it takes to log off the session. At block 365, a logoff takes place that ends testing for the server computer. Timing may also be performed at the server computer to determine how long it takes to log off the session.

Exemplary Computer Environment

The subject matter is described in the general context of computer-executable instructions, such as program modules, being executed by a computer such as server computer 105 and remote client computers 110(1), 110(2) . . . 110(N) of FIG. 1. Generally, program modules include routines, programs, objects, components, data structures, etc. that perform particular tasks or implement particular abstract data types. Moreover, those skilled in the art will appreciate that the subject matter may be practiced with other computer system configurations, including hand-held devices, multiprocessor systems, microprocessor-based or programmable consumer electronics, network PCs, minicomputers, mainframe computers, and the like. In a distributed computer environment, program modules may be located in both local and remote memory storage devices.

Figure 4:
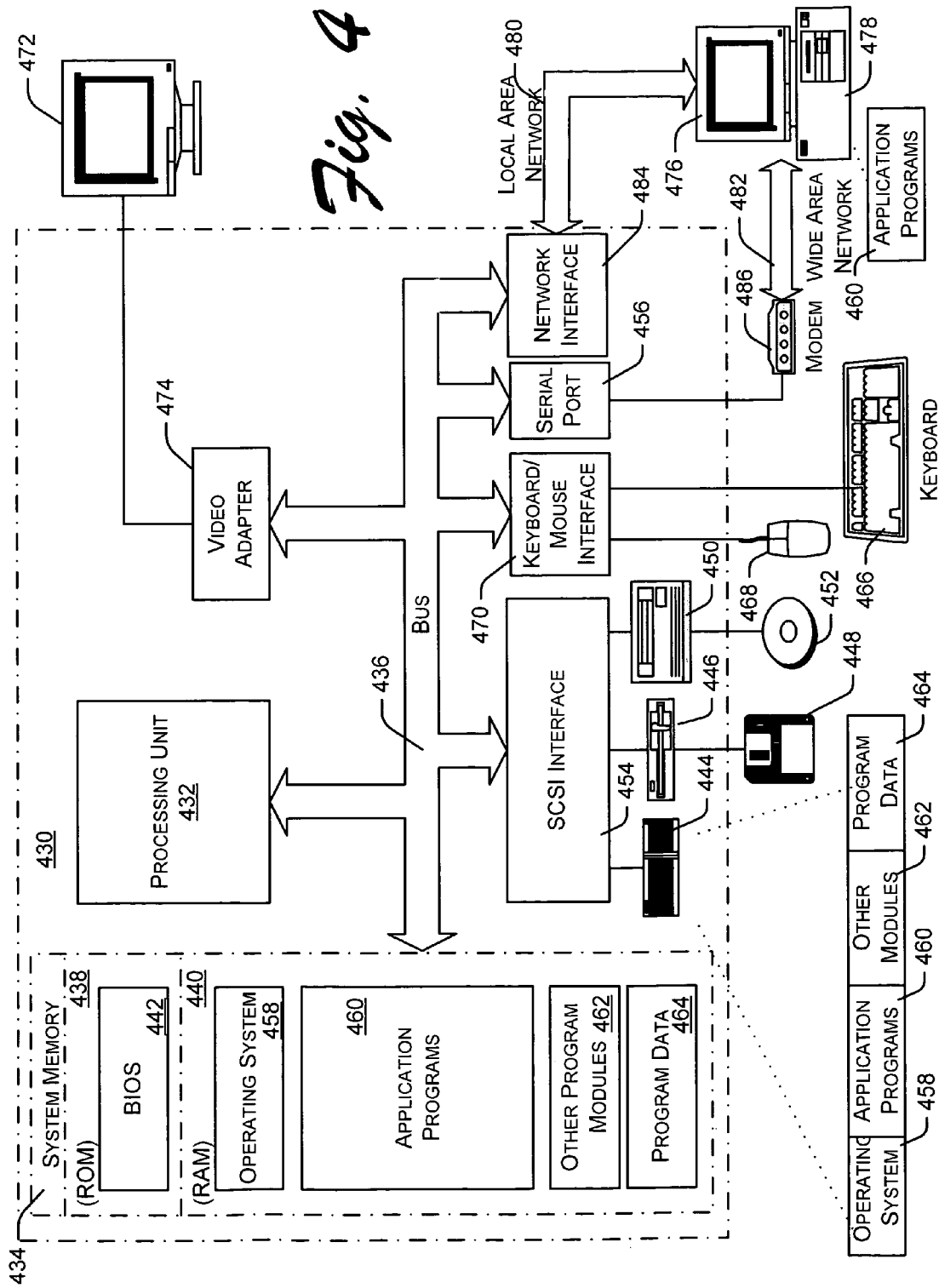
FIG. 4 is a block diagram illustrating a general example of a computer that is used in accordance with the subject matter.

FIG. 4 shows a general example of a computer 430 that is used in accordance with the subject matter. Computer 430 is shown as an example of a computer that can perform the functions of a server computer or a remote client computer. Computer 430 includes one or more processors or processing units 432, a system memory 434, and a bus 436 that couples various system components including the system memory 434 to processors 432. Processors 432 may initiate or configured to initiate a session with another computer. For example, as server computer 105, the program "serverRDP.exe" 210 of FIG. 2 instructs processor 432 to initiate or allow initiating of a session. As remote client computer 110, the program "clientRDP.exe" 235 instructs processor 432 to initiate or allowing initiating of a session.

The bus 436 represents one or more of any of several types of bus structures, including a memory bus or memory controller, a peripheral bus, an accelerated graphics port, and a processor or local bus using any of a variety of bus architectures. The system memory includes read only memory (ROM) 438 and random access memory (RAM) 440.

Programs such as "clientRDP.exe" 225 or "serverRDP.exe" 210, test tool application 215, RDP client session module 235, and test results log 240 of FIG. 2 may be stored in ROM 438 or RAM 440. ROM 438 or RAM 440 may be configured with registers or storage locations to indicate various sets of instructions and data (e.g., DLL files) used for various sessions between server computer 105 and remote client computers 110(1), 110(2) . . . 110(N).

A basic input/output system (BIOS) 442, containing the basic routines that help to transfer information between elements within computer 430, such as during start-up, is stored in ROM 438. Computer 430 further includes a hard disk drive 444 for reading from and writing to a hard disk, not shown, a magnetic disk drive 446 for reading from and writing to a removable magnetic disk 448, and an optical disk drive 450 for reading from or writing to a removable optical disk 452 such as a CD ROM or other optical media. The hard disk drive 444, magnetic disk drive 446, and optical disk drive 450 are connected to the bus 436 by an SCSI interface 454 or some other appropriate interface. The drives and their associated computer-readable media provide nonvolatile storage of computer readable instructions, data structures, program modules and other data for computer 430.

Although the exemplary environment described herein employs a hard disk, a removable magnetic disk 448 and a removable optical disk 452, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used in the exemplary operating environment.

A number of program modules may be stored on the hard disk, magnetic disk 448, optical disk 452, ROM 438, or RAM 440, including an operating system 458, one or more application programs 460, other program modules 462, and program data 464.

A user may enter commands and information into computer 430 through input devices such as keyboard 466 and pointing device 468. Other input devices (not shown) may include a microphone, joystick, game pad, satellite dish, scanner, or the like. These and other input devices are connected to the processing unit 432 through interface 470 that is coupled to bus 436. Monitor 472 or other type of display device is also connected to bus 436 via an interface, such as video adapter 474.

Computer 430 operates in a networked environment using logical connections to one or more remote computers, such as a remote computer 476. The remote computer 476 may be another personal computer, a server, a router, a network PC, a peer device or other common network node, and typically includes many or all of the elements described above relative to computer 430, although only a memory storage device 478 has been illustrated in FIG. 4. The logical connections depicted in FIG. 4 include a local area network (LAN) 480 and a wide area network (WAN) 482. Such networking environments are commonplace in offices, enterprise-wide computer networks, intranets, and the Internet.

When used in a LAN networking environment, computer 430 is connected to the local network 480 through a network interface or adapter 484. When used in a WAN networking environment, computer 430 typically includes a modem 486 or other means for establishing communications over the wide area network 482, such as the Internet. The modem 486, which may be internal or external, is connected to the bus 436 via a serial port interface 456. In a networked environment, program modules depicted relative to the personal computer 430, or portions thereof, may be stored in the remote memory storage device. It will be appreciated that the network connections shown are exemplary and other means of establishing a communications link between the computers may be used.

Generally, the data processors of computer 430 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory.

The subject matter described herein includes these and other various types of computer-readable storage media when such media contain instructions or programs for implementing the steps described below in reference to FIG. 4 in conjunction with a microprocessor or other data processor.

The subject matter also includes the computer itself when programmed according to the methods and techniques described below. Furthermore, certain sub-components of the computer may be programmed to perform the functions and steps described below. The subject matter includes such sub-components when they are programmed as described. In addition, the subject matter described herein includes data structures, described below, as embodied on various types of memory media.

For purposes of illustration, data, programs and other executable program components, such as the operating system are illustrated herein as discrete blocks, although it is recognized that such programs and components reside at various times in different storage components of the computer, and are executed by the data processor(s) of the computer.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A method performed at a thin client comprising:
   establishing a session with a server computer;
   receiving a set of instructions and data directed to providing graphics testing from the server computer, based on execution of a test tool resident at the server computer;
   creating a virtual channel to the server computer;
   receiving graphics testing information through the virtual channel for a plurality of graphics tests, each of the plurality of graphics tests being provided sequentially from the server computer to the thin client across the virtual channel, wherein a next one of said graphics tests is not sent until a previous graphics test has completed being sent across the virtual channel; and
   timing each sequential graphics test to determine a time that each graphics test takes to go across the virtual channel, wherein the time determined for each particular graphics test to go across the virtual channel is indicative of how well the particular graphics test performed.

2. The method of claim 1 wherein the establishing the session comprises receiving a request from the server computer using a remote desktop protocol.

3. The method of claim 1 wherein the establishing the session comprises sending a request to the server computer to establish the session using a remote desktop protocol.

4. The method of claim 1 wherein the receiving the set of instructions and data comprises receiving a dynamic link library file unique to the thin client for use in sending the tests and test information from the test tool to perform graphics testing.

5. The method of claim 4 wherein executing the test tool comprises sequentially executing a series of the graphics tests that are part of a graphics test application program.

6. The method of claim 1 wherein the creating comprises forming the virtual channel through a wide area network for transmission of asynchronous transfer mode cells representing the testing information between the server computer and the thin client.

7. The method of claim 1 wherein the creating comprises forming the virtual channel through the Internet for transmission of asynchronus transfer mode cells representing the testing information between the server computer and the thin client.

8. The method of claim 1 wherein the creating the virtual channel comprises registering a unique virtual channel identifier for the thin client with the server computer.

9. The method of claim 1 further comprising timing each of the graphics tests at the thin client and storing times of each of the tests at the thin client.

10. The method of claim 9 further comprising timing each of the graphics tests at the server computer in addition to the timing at the then client.

11. The method of claim 1, wherein the graphics tests comprise at least one of video processing tests, disk inspection tests, or graphics accelerator tests.

12. A personal computer configured to perform the method of claim 1.

13. A method performed by a server computer comprising:
   establishing a session with a thin client computer over a network;
   storing a set of instructions and data directed to graphics testing applicable to the remote thin client computer in a registry, wherein the graphics testing is performed by a resident test tool executed at the server computer;
   sending the set of instructions and data directed to the graphics testing to the thin client computer;
   creating a virtual channel with the thin client computer through which testing information related to the graphics testing is transferred;
   sending the testing information to the thin client for a plurality of graphics tests, each of the plurality of graphics tests being provided sequentially from the server computer to the thin client across the virtual channel, wherein a next one of said graphics tests is not sent until a previous graphics test has completed being sent across the virtual channel; and
   timing each sequential graphics test to determine a time that each graphics test takes to go across the virtual channel, wherein the time determined for each particular graphics test to go across the virtual channel is indicative of how well the particular graphics test performed.

14. The method of claim 13 wherein the establishing the session comprises receiving a request from the thin client computer using a remote desktop protocol.

15. The method of claim 13 wherein the establishing the session comprises sending a request to the thin client computer using a remote desktop protocol.

16. The method of claim 13 wherein the storing the set of instructions and data comprises loading a dynamic link library file which is used by the resident test tool to send the testing information to the thin client computer.

17. The method of claim 16 wherein the resident test tool is executed as a sequential series of the graphics tests that are part of a resident test application program.

18. The method of claim 17 further comprising timing each of the graphics tests at the server computer.

19. The method of claim 13 wherein the creating comprises forming the virtual channel through a wide area network for transmission of asynchronous transfer mode cells representing the testing information between the server computer and the thin client computer.

20. The method of claim 13 wherein the creating comprises forming the virtual channel through the Internet for transmission of asynchronous transfer mode cells representing the testing information between the server computer and the thin client computer.

21. The method of claim 13 further comprising timing individual said graphics tests to determine a time that each graphics test takes to go across the virtual channel at both the server computer and the thin client computer.

22. The method of claim 13, wherein the graphics tests comprise at least one of video processing tests, disk inspection tests, or graphics accelerator tests.

23. A server computer configured to perform the method of claim 13.

24. A method for testing graphics capabilities of a thin client computer, the method comprising:
    establishing a testing session between the thin client computer and a server computer via a remote desktop protocol, said server computer having a resident testing tool application including a sequential list of graphics tests;
    receiving a dynamic link library (DLL) file at the thin client computer from the server computer, said DLL file being unique to the thin client computer for enabling the graphics tests to be sent from the server to the thin client computer;
    establishing a communication channel over a network between the thin client computer and the server computer, said communication channel providing for transmission of asynchronous transfer mode cells representing testing information between the server computer and the thin client computer;
    performing graphics tests remotely on the thin client computer from the testing tool resident on the server computer by sending the test information for each graphics test in the list sequentially from the server computer to the thin client computer across the communication channel, wherein a next test in the sequentially ordered list is not sent until a previous test has completed being sent across the communication channel; and
    timing the graphics test to determine a time that each sequential graphics test takes to go across the communication channel, wherein the time that each particular graphics test takes to go across the communication channel is indicative of how well the particular graphics test performed.

25. The method of claim 24 wherein the timing of the graphics tests is performed at both the server computer and the thin client computer.

26. The method of claim 24 wherein the establishing a communication channel over a network comprises establishing a virtual channel through a wide area network.

27. The method of claim 24 wherein there are a plurality of the thin client computers, and further comprising testing the graphics capability of each thin client computer by performing the graphics test.

28. A method for testing graphics capabilities of a thin client computer, the method comprising:
    accessing the thin client computer from a server computer over a network;
    storing instructions and data used by a test tool executed at the server computer to provide testing to the remote thin client computer;
    identifying particular instructions an data used for the remote thin client computer;
    setting up a virtual channel between the server computer; and
    timing a plurality of sequentially performed graphics tests performed by the test tool through the virtual channel to determine a time that each of the graphics test takes to go across the virtual channel, wherein the time that the graphics test takes to go across the virtual channel is indicative of how well the graphics test performed.

29. The method of claim 28 wherein the instructions and data comprise a dynamic link library file unique to the thin client computer.

30. The method of claim 28 wherein the setting up the virtual channel is performed over a wide area network for transmission of asynchronous transfer mode cells representing the testing information between the server computer and the thin client computer.

31. The method of claim 28 wherein the timing the graphics test is performed at both the server computer and the thin client computer.

32. A thin client computer comprising:
    a memory; and
    a processor coupled to the memory
    wherein the processor is configured to access a test tool on a server computer using a remote desktop protocol for establishing a testing session,
    wherein the processor is configured to receive a plurality of graphics tests through the communication channel, each of the plurality of graphics tests being provided sequentially from the server computer to the thin client computer; and
    wherein the processor is configured to time individual said graphics tests to determine a time that each sequential graphics test takes to go across the communication channel, wherein the time is indicative of how well each graphics test performed.

33. The computer of claim 32 wherein the processor is configured to receiving a dynamic link library (DLL) file from the server computer, said DLL file being unique to the thin client computer for enabling the graphics test to be sent from the server to the thin client computer.

34. The computer of claim 32 wherein the communication channel is a virtual channel for transmission of asynchronous transfer mode cells representing the graphics tests between the server computer and the thin client computer.

35. The computer of claim 32 wherein the processor is configured to establish a testing session with the server computer via a remote desktop protocol.

36. The computer of claim 32 wherein the processor is further configured to receive a request from the server computer using a remote desktop protocol.

37. A server computer comprising:
a memory; and
a processor coupled to the memory,
wherein the processor is configured to access a remote thin client computer for transmitting graphics testing information from a resident test tool through a communication channel,
wherein the processor is configured to send a plurality of graphics test through the communication channel, each of the plurality of graphics test being provided sequentially from the server computer to the thin client computer; and
wherein the processor is configured to time each sequential graphics test to determine a time that each graphics test takes to go across the communication channel for determining a result of each graphics test.

38. The computer of claim 37 wherein the communication channel is a virtual channel for transmission of asynchronous transfer mode cells representing the testing information between the server computer and the thin client computer.

39. The computer of claim 37 wherein the processor is configured to send a dynamic link library (DLL) file to the thin client computer, said DLL file being unique to the thin client computer for enabling the graphics tests to be sent from the server to the thin client computer.

40. The computer of claim 37 wherein the processor is configured to establish a testing session with the thin client computer via a remote desktop protocol.

41. The computer of claim 37 wherein the graphics tests comprise at least one of video processing tests, disk inspection tests, or graphics accelerator tests.

42. A computer-readable storage medium having computer-executable instructions, implemented at least in part by a computing device, for performing steps at a thin client computer comprising:
contacting a server computer to send instructions and data used to access a test tool in the server computer;
setting up a virtual channel in which testing is exclusively performed by the test tool at the server computer;
determining the beginning and ending of a plurality of individual graphics tests represented by the testing information, each of the plurality of individual tests being provided sequentially from the server computer to the thin client computer; and
timing the individual graphics tests based on the determined beginnings and endings to determine a time that each graphics test takes to go across the virtual channel, wherein the time is indicative of how well each graphics test performed.

43. The computer-readable medium of claim 42, wherein the graphics tests comprise at least one of video processing tests, disk inspection tests, or graphics accelerator tests.

44. The computer-readable medium of claim 43 wherein the contacting the server further comprises sending a request to the server computer to establish a testing session using a remote desktop protocol.

45. A computing device comprising:
a processor configured to initiate a session with a remote thin client computing device;
a memory module configure to store a dynamic link library in a register, wherein the dynamic link library is directed to send information and perform testing regarding a resident graphics test to the remote thin client computing device; and
an interface to send the dynamic link library to the remote client computing device through a network; and
a timer configured to time a plurality of graphics tests sent to the remote thin client computing device, each of the plurality of graphics tests being provided sequentially from the server computer to the remote thin client computing device to determine a time that each graphics test takes to be transmitted to the remote thin client computing device, wherein the time determined for each particular graphics test is indicative of how well the particular graphics test performed.

46. The computing device of claim 45 wherein the network comprises a virtual channel between the computing device and the remote client computing device for transmission of asynchronous transfer mode cells representing the testing information between the server computer and the remote thin client computing device.

47. A system comprising:
one or more remote thin client computers; and
a server computer configured to identify software modules performed on the server computer used to provide graphical tests through a communication channel directed to particular remote client computers, wherein the software modules are used to provide the graphical tests,
wherein the server is configured to send graphics testing information through the communication channel for a plurality of graphics tests, each of the plurality of graphics tests being provided sequentially from the server computer to the one or more thin client computers across the communication channel, wherein a next one of said graphics tests is not sent until a previous graphics test has completed being sent across the communication channel, and
wherein at least one of the server and the one or more thin client computers are configured to time each graphics test to determine a time that each graphics test takes to go across the communication channel for determining a result of each graphics test.

48. The system of claim 47 wherein the communication channel is a virtual channel for transmission of asynchronous transfer mode cells representing the testing information between the server computer and the one or more thin client computers.

* * * * *

UNITED STATES PATENT AND TRADEMARK OFFICE
CERTIFICATE OF CORRECTION

PATENT NO.       : 7,526,410 B2
APPLICATION NO.  : 10/613179
DATED            : April 28, 2009
INVENTOR(S)      : Demitri Anastassopoulos et al.

It is certified that error appears in the above-identified patent and that said Letters Patent is hereby corrected as shown below:

In column 10, line 35, in Claim 10, delete "then client." and insert -- thin client --, therefor.

In column 10, line 45, in Claim 13, after "to the" delete "remote".

In column 11, line 59, in Claim 24, after "graphics" delete "test" and insert -- tests --, therefor.

In column 12, line 7, in Claim 27, after "graphics" delete "test." and insert -- tests. --, therefor.

In column 12, line 15, in Claim 28, after "instructions" delete "an" and insert -- and --, therefor.

In column 12, line 19, in Claim 28, after "graphics" delete "tests" and insert -- test --, therefor.

In column 12, line 56, in Claim 33, after "graphics" delete "test" and insert -- tests --, therefor.

In column 13, line 9, in Claim 37, after "graphics" delete "test" and insert -- tests --, therefor.

In column 13, line 10, in Claim 37, after "graphics" delete "test" and insert -- tests --, therefor.

Signed and Sealed this
Third Day of May, 2011

David J. Kappos
*Director of the United States Patent and Trademark Office*